United States Patent
Kita et al.

(10) Patent No.: US 8,142,157 B2
(45) Date of Patent: Mar. 27, 2012

(54) SEPARABLE BLADE FOR WIND TURBINE

(75) Inventors: Masakazu Kita, Tokyo (JP); Yuki Kominato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1100 days.

(21) Appl. No.: 12/018,372

(22) Filed: Jan. 23, 2008

(65) Prior Publication Data

US 2008/0240925 A1 Oct. 2, 2008

(30) Foreign Application Priority Data

Jan. 23, 2007 (JP) .................................. 2007-012504

(51) Int. Cl.
*F03D 11/00* (2006.01)

(52) U.S. Cl. ................. 416/146 R; 416/224; 416/229 R; 416/231 R

(58) Field of Classification Search .............. 416/146 R, 416/224, 229 R, 231 R, 231 B
See application file for complete search history.

(56) References Cited

U.S. PATENT DOCUMENTS

| | | | |
|---|---|---|---|
| 6,612,810 B1 * | 9/2003 | Olsen et al. | 416/95 |
| 7,186,086 B2 * | 3/2007 | Yoshida | 416/146 R |
| 7,891,947 B2 * | 2/2011 | Chen et al. | 416/225 |
| 7,922,454 B1 * | 4/2011 | Riddell | 416/224 |

FOREIGN PATENT DOCUMENTS

| | | |
|---|---|---|
| JP | 2003518586 | 6/2003 |
| JP | 2003214322 | 7/2003 |
| JP | 200411616 | 1/2004 |
| JP | 2005220805 | 8/2005 |

* cited by examiner

*Primary Examiner* — Ninh H Nguyen
(74) *Attorney, Agent, or Firm* — Haynes and Boone, LLP

(57) ABSTRACT

To provide a light and economical separable blade for a wind turbine that is also equipped with a lightning rod function. A separable blade for a wind turbine wherein the blade as a whole is assembled by connecting two electrically non-conductive part blades 1T and 1R in the lateral direction, comprising metal fasteners 4, 5, 6, and 7 for fastening together the two adjacent part blades, and lightning discharge conductive wires 8 and 9, provided in an inner blade portion. The fastener 4 is exposed on the blade surface of the part blade 1T, and is connected to the lightning discharge conductive wire 9 through the other fasteners 5, 6, and 7, or a lightning discharge conductive wire 8. The lightning discharge conductive wire 9 extends to the blade root.

10 Claims, 7 Drawing Sheets

Section View C-C

Section View D-D

Section View E-E

SEPARABLE BLADE FOR WIND TURBINE

CROSS REFERENCE TO RELATED APPLICATIONS

This application claims priority under 35 U.S.C. 119 based upon Japanese Patent Application Serial No. 2007-012504, filed on Jan. 23, 2007. The entire disclosure of the aforesaid application is incorporated herein by reference.

FIELD OF THE INVENTION

The present invention relates to the fastening of separable blades for wind turbines, and the lightning protection structures thereof.

BACKGROUND OF THE INVENTION

It is well known that so-called horizontal axis wind turbines are widely used in wind power generation systems. An ordinary horizontal axis wind turbine is comprised by a rotor whereon at least two or more blades are radially attached from a hub, a nacelle that is connected to the hub and axially supports this rotor through a main shaft that is extended in an approximate horizontal direction, and a tower that is installed in an approximate vertical direction and supports the nacelle in a yaw rotatable state.

Recently progress has been made in increasing the size of horizontal axis wind turbines in order to improve the electrical generation capabilities. Lightweight and strong, FRP (fiber-reinforced plastics) have been the choice for the materials for blades.

Moreover, in order to facilitate ease of transport, separable blades have been proposed wherein part blades, which are partitioned in the longitudinal direction, are connected in series to form the whole. There is, for example, the technology such as described in Japanese Unexamined Patent Application Publication 2004-11616, wherein a connecting member is provided in the vicinity of a connecting section between part blades that are connected in series together, where the part blades and the connecting member are secured together with bolts.

In this case, a connecting member is required when the part blades are connected together, which is undesirable not only because of the precision required in the machining thereof, but because of the additional cost and weight.

Furthermore, there is another technology wherein bolts and straps are used to connect together the part blades such as described in Japanese Examined Patent Application Publication 2003-518586. Connecting in this way forms a large number of protruding parts on the surface of the blade, causing problems in terms of aerodynamic performance and noise. Additionally, this ties to increased weight and cost, the same as with the technology described in Japanese Unexamined Patent Application Publication 2004-11616.

Additionally, when the connecting members between part blades are secured by a metal frame, as described in Japanese Unexamined Patent Application Publication 2003-214322, this not only leads to increased weight and cost, but also to concerns about problems such as resonant frequencies and abrupt changes in stiffness (concentration of stresses).

On the other hand, for wind-power generation, horizontal axis wind turbines are installed in wide open spaces, and the blades thereof are located in environments prone to lightning strikes.

Hereupon, blades comprising a non-conductive material such as FRP differ from metallic blades and if struck by lightning, there is danger that the lightning bolt current will not be able to dissipate to ground resulting in damage. Recently, the increasing sizes of wind turbines which use FRP has resulted in increasing occurrences of damage due to lightning. Because of this, a conductive material is attached to an FRP blade body as a countermeasure against lightning damage in a conventional wind power generation system that uses FRP blades.

In consideration of the various problems described above, in the technology described in Japanese Unexamined Patent Application Publication 2005-220805, two part blades that are connected together, namely an inner blade part (on the blade root side) and an outer blade part (on the blade tip side) are connected together by a connecting member (a barrel nut and a tension bolt) with a metal plate interposed therebetween. The periphery of this metal plate is exposed at the surface of the blade, and when a lightning strikes, the electrical current from the lightning that is conducted in the metal plate is carried to the outside of the part blade through lightning discharge conductors within the blade, to escape to ground. Although this metal plate functions as a lightning receptor, there is still the problem of the provision of the metal plate leading to increased cost and weight.

The present invention was the result of contemplation on the problems with the prior art described above, and the object thereof is to provide a light and economical separable blade for a wind turbine that is also equipped with a lightning protection function.

SUMMARY OF THE INVENTION

In order to solve the problems described above, a first aspect of the present invention is a separable blade for a wind turbine wherein non-conductive part blades are connected in series in the longitudinal direction to assemble the blade as a whole, having:
  a fastener for fastening together two adjacent part blades, disposed in an inner blade portion; and
  a lightning discharge conductive wire that extends to a blade root, disposed in the inner blade portion;
  wherein a portion of the fastener is exposed on the blade surface of at least one of the two part blades, and at least the portion of the fastener exposed at the blade surface has an electrically conductive material, and is connected electrically to the lightning discharge conductive wire.

A second aspect of the present invention is a separable blade for a wind turbine having:
  a non-conductive first part blade;
  a non-conductive second part blade wherein the blade tip side end surface thereof is connected to the blade root side end surface of the first part blade;
  a fastener for fastening the first part blade and the second part blade; and
  a lightning discharge conductive wire that extends to a blade root, disposed in an inner blade portion;
  wherein a first hole part that is open on the blade surface and a second hole part that is communicated with the first hole part and that is open on the blade root side end surface of the first part blade are formed in a blade root side end portion of the first part blade; and
  a third hole part that is open on the blade surface and a fourth hole part that is communicated with the third hole part and that is open on the blade tip side end surface of the second part blade and continuously communicates with the second hole part are formed in a blade tip side end portion of the second part blade; wherein the fastener has:

a first fastener that is disposed within the first hole part and locked by the first hole part;

a second fastener that is disposed within the third hole part and locked by the third hole part; and a third fastener, which passes through the second hole part and the fourth hole part, which continuously communicate each other, for connecting the first fastener to the second fastener, to fasten tensely the first part blade to the second part blade; wherein at least one of the first fastener and the second fastener is made from an electrically conductive material and one end surface thereof is exposed at the blade surface through the hole part (that is, the first hole part for the first fastener or the third hole part for the second fastener), and is connected electrically to the lightning discharge conductive wire.

A third aspect of the present invention is a separable blade for a wind turbine as set forth in the second aspect wherein a cover member is provided for covering an opening that opens at the blade surface of either the first hole part or the third hole part, and the fastener of the other hole part (that is, the first fastener for the first hole part or the second fastener for the third hole part) is exposed at the blade surface.

A fourth aspect of the present invention is a separable blade for a wind turbine as set forth in the second or third aspect, wherein the third fastener is a rod member having an external threaded portion on a tip portion thereof, wherein the fastener comprises a nut that threads onto the external threaded portion and that is housed within either the first hole part or the third hole part, and a jack bolt that screws onto the peripheral part of the nut to jack up the nut, wherein the lightning discharge conductive wire is connected to the jack bolt.

A fifth aspect of the present invention is a separable blade for a wind turbine as set forth in the fourth aspect, wherein the cover member is provided for covering the opening of the hole part that opens at the blade surface, the hole part being either the first hole part or the third hole part that houses the nut.

A sixth aspect of the present invention is a separable blade for a wind turbine as set forth in any of the first through fifth aspects, further comprising a lightning receptor part on a blade tip part.

A seventh aspect of the present invention is a separable blade for a wind turbine as set forth in any of the first through sixth aspects, wherein the lightning discharge conductive wire is connected to a plurality of the fasteners that are provided.

In the present invention, a portion of the fastener is exposed at the blade surface as a lightning receptor part, and is connected to a lightning discharge conductive wire in a blade inner portion. The present invention was the result of contemplation on the problems with the prior art described above, and the object thereof is to provide a light and economical separable blade for a wind turbine that is also equipped with a lightning rod function.

DETAILED DESCRIPTION OF THE PREFERRED EMBODIMENTS

An embodiment of the present invention will be described below in accordance with accompanying drawing. The below is one embodiment of the present invention, and not intended to limit the present invention.

Figure 1:
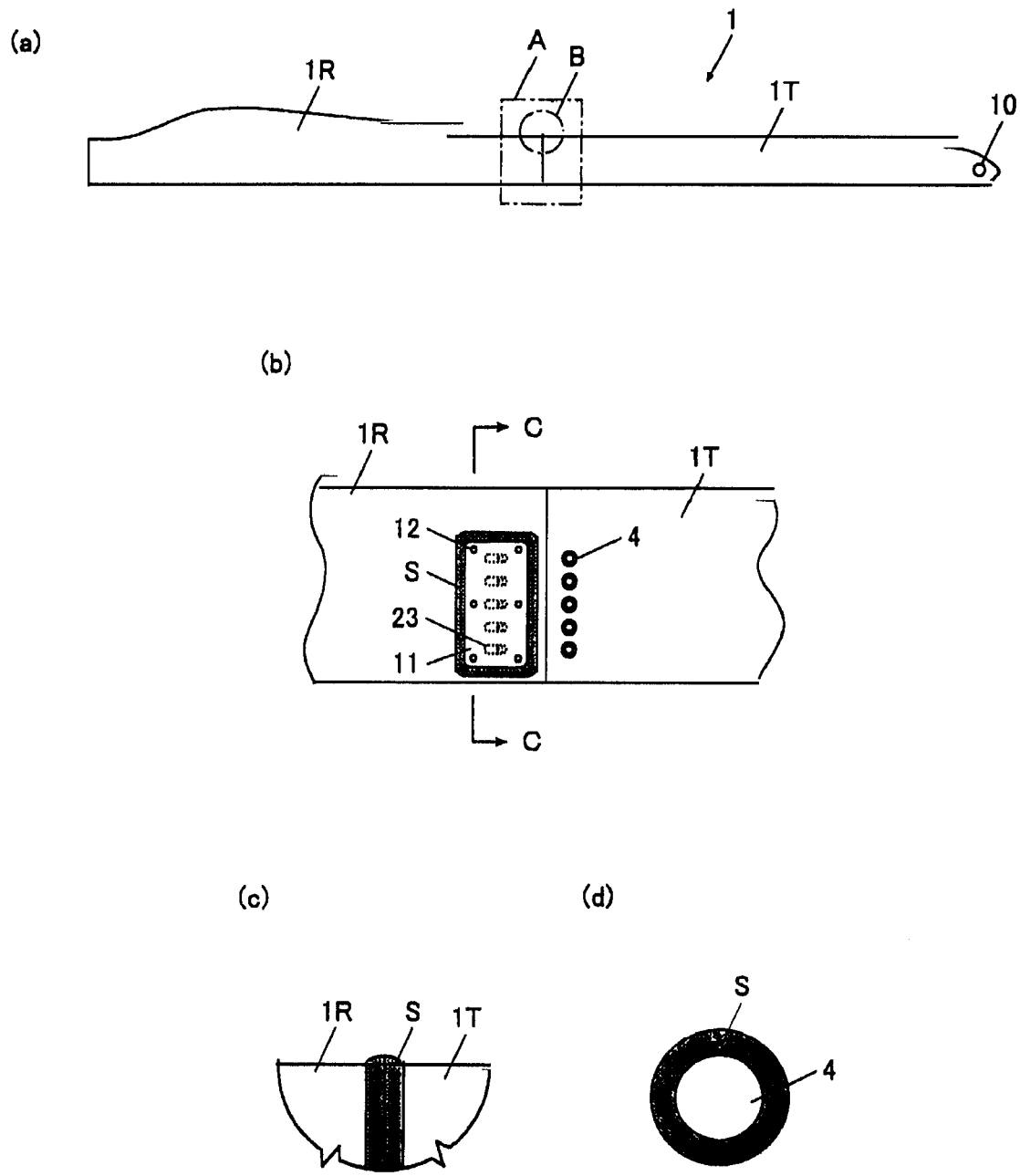
FIG. 1 (a) is an overall view of a separable blade as set forth in one embodiment of the present invention; (b) is a detail view of part A; (c) is a detail view of part B; and (d) is an expanded view of the exposed surface of the first fastener.
Figure 2:
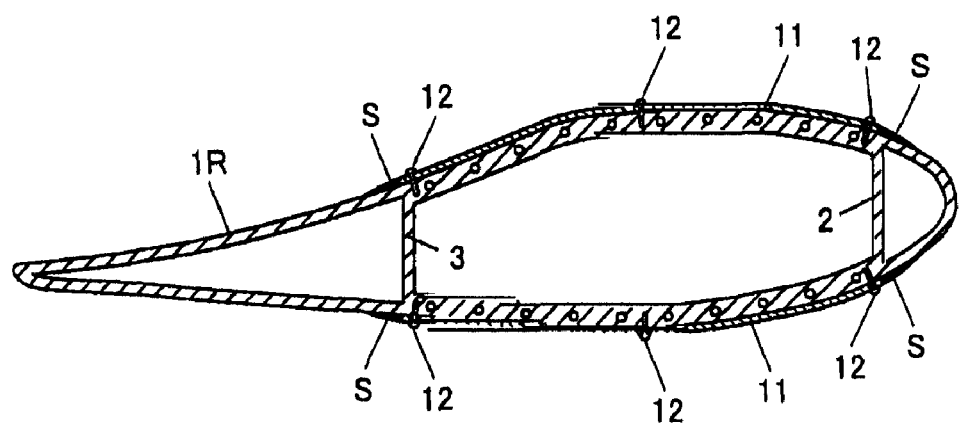
FIG. 2 is a cross-sectional diagram along section C-C shown in FIG. 1 (b).
Figure 3:
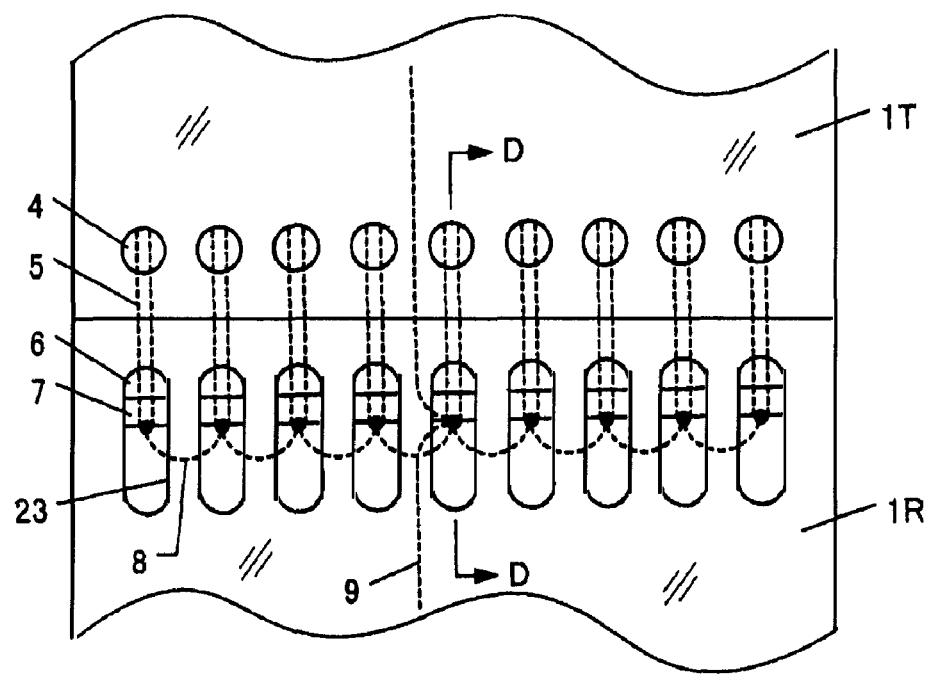
FIG. 3 is a plan view schematic diagram of the connector part of the separable blade.
Figure 4:
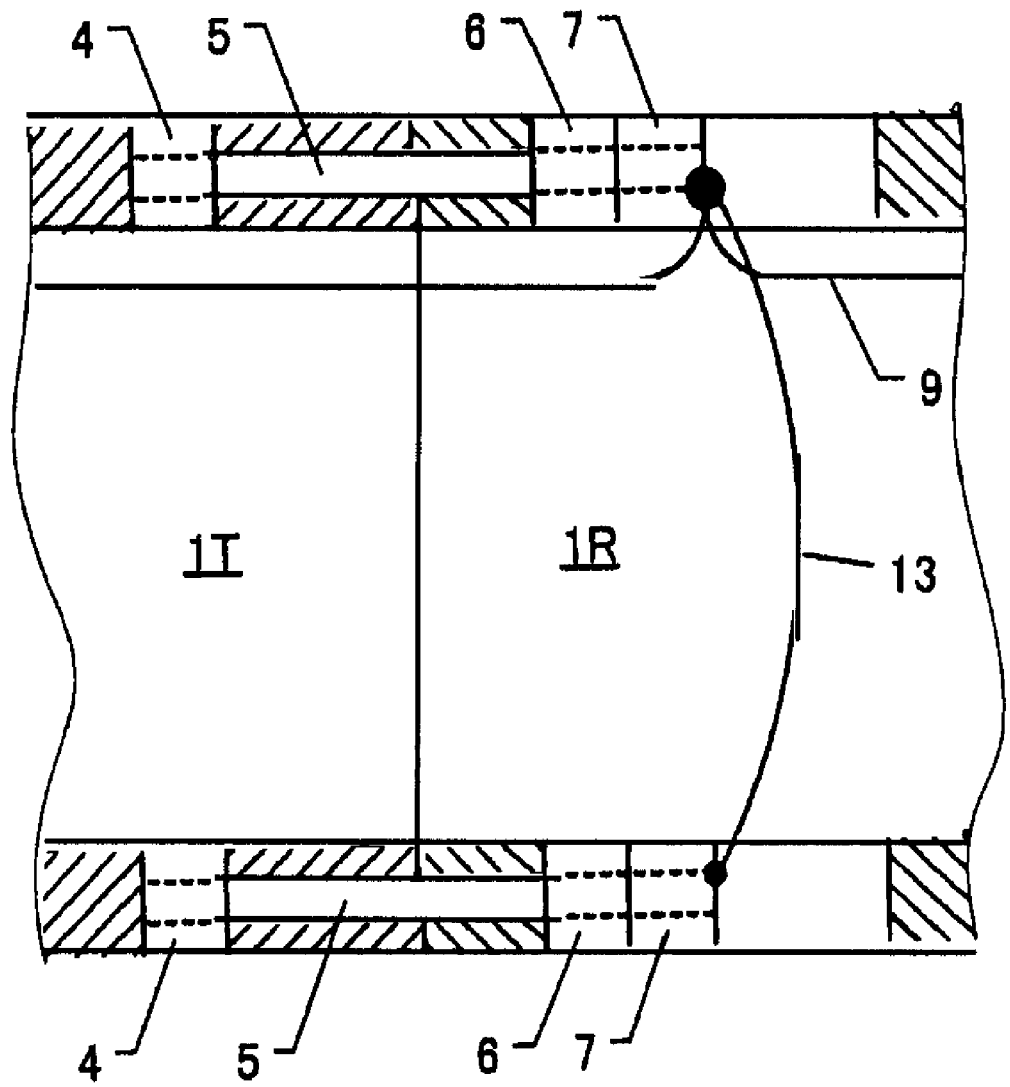
FIG. 4 is a cross-sectional schematic diagram along section D-D shown in FIG. 3.

FIG. 1 (a) is an overall view of a separable blade as set forth in one embodiment of the present invention. FIG. 1 (b) is a detail view of part A; FIG. 1 (c) is a detail view of part B; and FIG. 1 (d) is an expanded view of the exposed surface of the first fastener. FIG. 2 is a cross-sectional diagram along section C-C shown in FIG. 1 (b). FIG. 3 is a plan view schematic diagram of the connector part, and FIG. 4 is a cross-sectional diagram along section D-D.

As a shown in FIG. 1 and FIG. 2, the separable blade 1 of the present embodiment is structured from a first part blade 1T on the blade tip side, and a second part blade 1R on the blade root side. The part blades 1T and 1R are made from a non-electrically conductive material such as FRP, and, as shown in FIG. 2, have a structure wherein top and bottom outer planes are held in a front beam 2 and a back beam 3. The detailed connecting structure in the second part blade 1R on the blade root side is shown in FIG. 5, and the detailed connecting structure in the first part blade 1T on the blade tip side is shown in FIG. 6.

In the outer panel parts of the part blades 1R and 1T, a hole that passes through in the direction of thickness of the panels, another hole that is communicated with the other hole and opens at the connecting surface are formed. Specifically, as is shown in FIG. 6, a first hole part 21 that is open on the blade surface and a second hole part 22 that is communicated with first hole part 21 and that is open on the blade root side end surface 25 of the first part blade 1T are formed in the blade root side end portion of the first part blade 1T.

Figure 5:
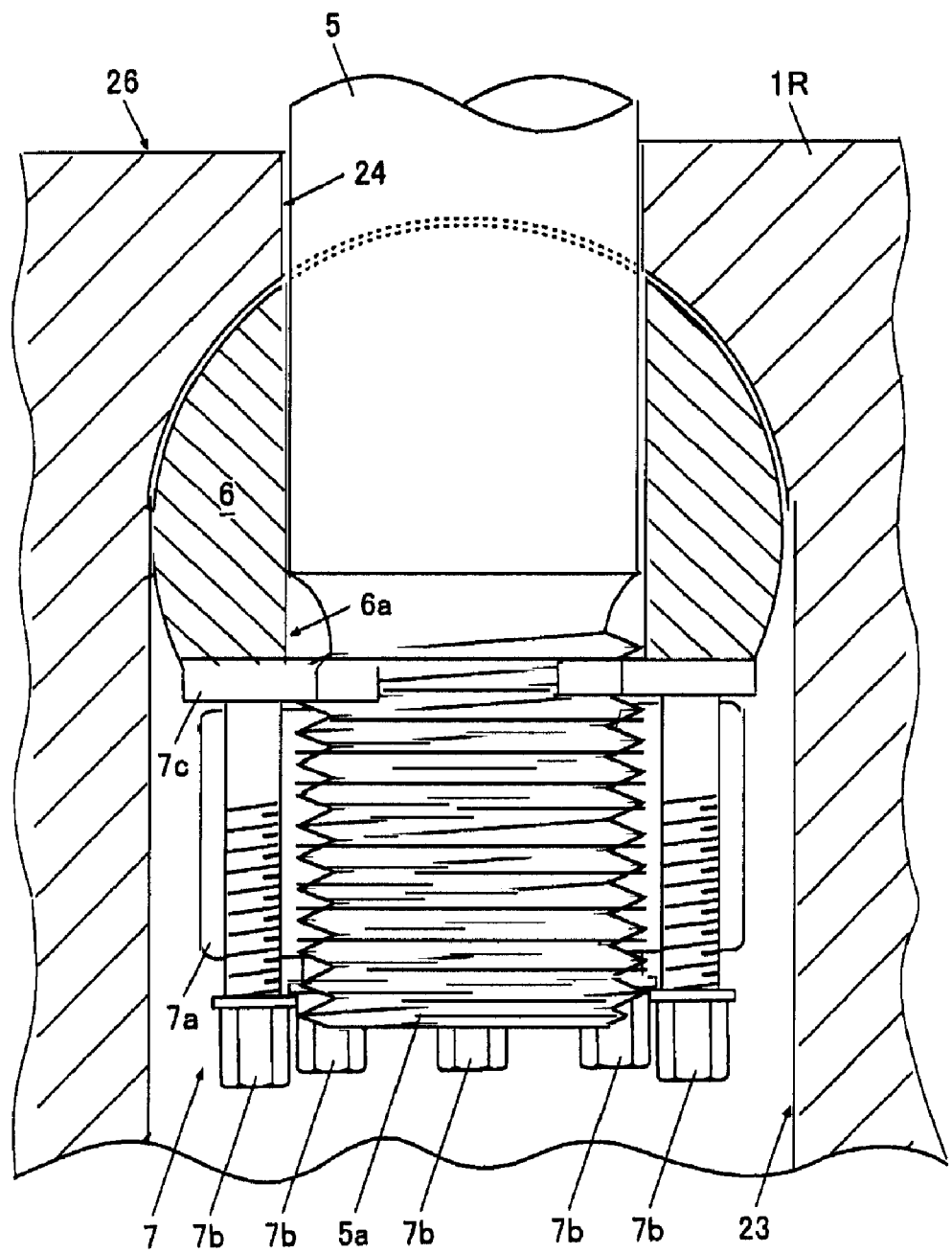
FIG. 5 is a partial cross-sectional diagram illustrating the detail of the connecting structure in the second part blade on the blade root side.
Figure 6:
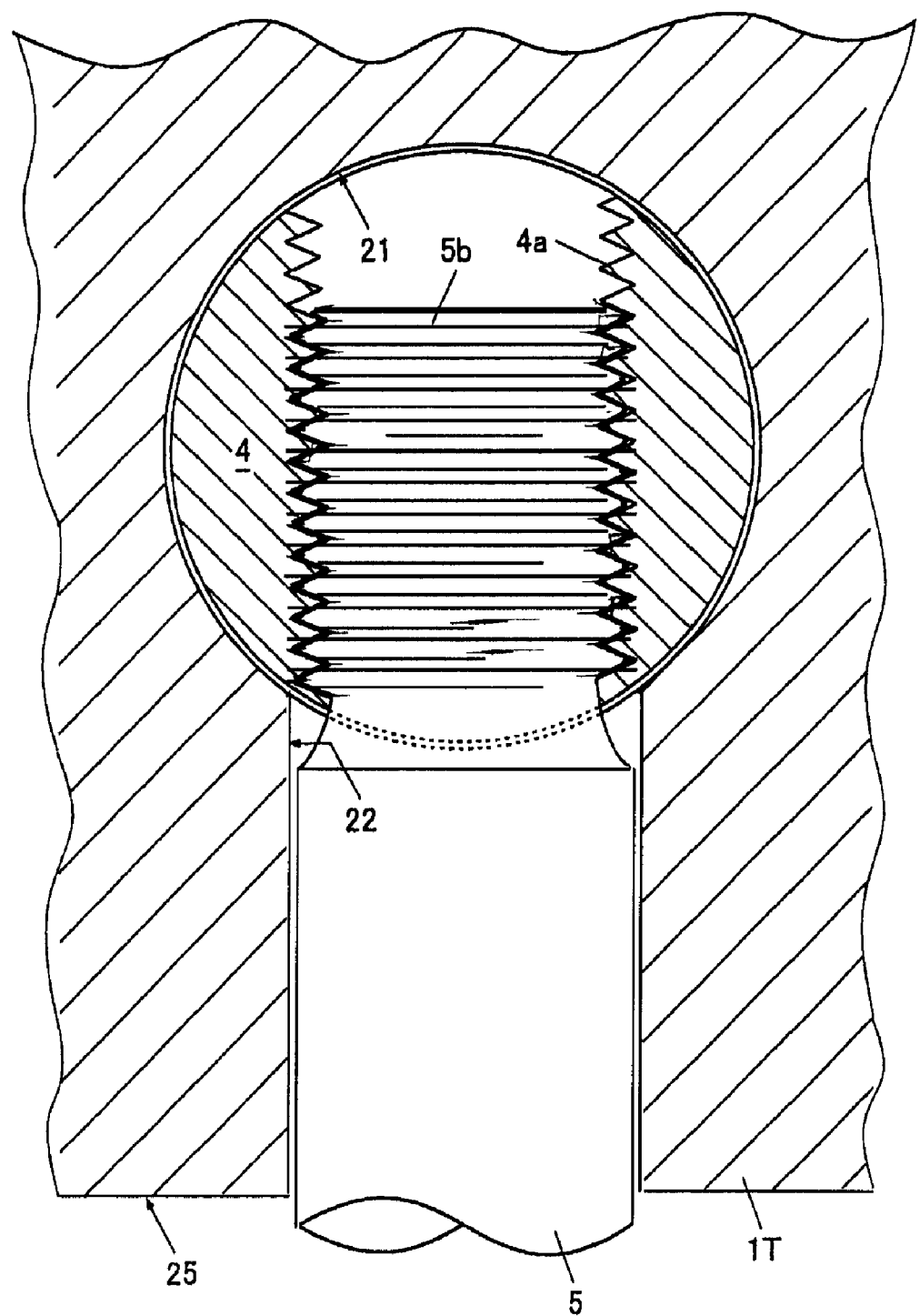
FIG. 6 is a partial cross-sectional diagram illustrating the detail of the connecting structure in the first part blade on the blade tip side.

Additionally, as is shown in FIG. 5, a third hole part 23 that is open on the blade surface and a fourth hole part 24 that is communicated with the third hole part 23 and that is open on the blade tip side end surface 26 of the second part blade 1R and that continuously communicates with the second hole part 22 are formed in the blade tip side end portion of the second part blade 1R.

At the time of assembly, first the first fastener 4 is inserted into the first hole part 21. The first fastener 4 is a cylindrical metal component, and a horizontal hole 4a, wherein internal threads are cut, is open in the center of the periphery thereof. The first hole part 21 has a diameter of a size that is able to essentially accommodate the first fastener 4 without a gap. The first hole part 21 may be an opening wherein there is a gap with the first fastener 4 on the blade tip end side, but because there will be the need to fill the gap later, preferably the design is such that, if possible, there will be no gap.

Next, one end of the third fastener 5, having an external threaded portion 5*b* is inserted from the second hole part 22 and screwed into the horizontal hole 4*a*, and the first fastener 4 and the third fastener 5 are screwed together. The first fastener 4 is held by the first hole part 21, so the third fastener 5 cannot be withdrawn without unscrewing from the first fastener 4. The third fastener 5 is a metal bolt having external threaded portions 5*a* and 5*b* on both ends thereof.

After the operations described above have been completed for all sets of first fasteners 4 and third fasteners 5, In order to insert the end of parts of the third fasteners 5 having the external threaded portions 5*a*, protruding from the blade root side end surfaces 25 of the first part blades 1T, into the fourth hole parts 24, and the blade root side end surfaces 25 of the first part blades 1T and the blade tip side end surfaces 26 of the second part blades 1R are aligned. At this time, the lightning discharge conductive wire 9 that extends from the tip lightning receiver part 10 is passed into the second part blade 1R. Additionally, the second fastener 6 is disposed within the third hole part 23, and the end part of the third fastener 5 having the external threaded portion 5*a* is inserted into the horizontal hole 6*a* of the second fastener 6. When the blade root side end surface 25 of the first part blade 1T and the blade tip side end surface 26 of the second part blade 1R are brought somewhat together, the external threaded portion 5*a* will protrude to the blade root side from the horizontal hole 6*a*, as shown in FIG. 5. The third fastener 5 is passed through the second hole part 22 and the fourth opening port 24.

The third hole part 23 is a long hole, having a cylindrical inner surface, in the end part on the blade tip end side. The second fastener 6 is a cylindrical metal component, and a horizontal hole 6*a* is open in the center of the periphery thereof. Note that a portion of the periphery of the second fastener 6 is formed as a flat surface so as to ensure a seat for the fastener 7.

Next, the nut 7*a* of the fastener 7 is screwed onto the external threaded portion 5*a*. The fastener 7 each comprise a nut 7*a*, a jack bolt 7*b*, and a washer 7*c*, all made of metal, and can use off-the-shelf products.

The jack bolt 7*b* screws onto the periphery of the nut 7*a* to jack up relative to the watcher 7*c*. The washer 7*c* lays against the flat surface that is formed in a portion of the periphery of the second fastener 6.

Here, before passing to the next process, a lightning discharge conductive wire 8 is attached to the jack bolt 7*b* of each of the fasteners 7, and the various fasteners 7 are connected by the lightning discharge conductive wires 8, as shown in FIG. 3. Similarly, as shown in FIG. 4, the upper and the lower fasteners 7 and 7 are connected by the lightning discharge conductive wire 13*a* by installing the lightning discharge conductive wire 13 to at least one jack bolt 7*b* on each side. Additionally, the lightning discharge conductive wire 9 that extends from the tip lightning receiver part 10 is connected to at least one of the jack bolt 7*b*. The end portion of the lightning discharge conductive wire 9 extends toward the blade root and comes out the opening at the blade root.

Next, the jack bolt 7*b* is screwed in to jack up the nut 7*a* relative to the washer 7*c*. That is, a wrench is inserted into the third hole part 23 to fit onto the head of the jack bolt 7*b*, rotate the jack bolt 7*b* in the screw-in direction. This causes the first fastener 4 and the second fastener 6 to be tightened in the direction of mutually approaching each other. The first fastener 4 interlocks with the first hole part 21, and the second fastener 6 interlocks with the third hole part 23. Consequently, a tensile force is produced on the third fastener 5, and the third fastener 5 fastens tensely the first part blade 1T and the second part blade 1T. The lightning discharge conductive wires 8, 9, and 13, which are attached to the jack bolt 7*b*, are pinched between the head of the jack bolt 7*b* and the nut 7*a*, to be connected securely.

After the operations described above have been completed for all sets of fasteners, then, as shown in FIG. 1 (*b*) and FIG. 2, a cover member 11, for covering the opening that opens at the blade surface of the third hole part 23, is attached to the blade surface of the second part blade 1R. The cover member 11 is secured to the outer panel of the second part blade 1R by a tapping thread 12.

As is shown in FIGS. 1 (*b*), (*c*), and (*d*), the periphery of the cover member 11, the partition parts of the first part blade 1T and the second part blade 1R, and the periphery of the exposed part of the first fastener 4 are caulked with a sealant S made from epoxy or silicone. A non-electrically-conductive material such as resin or FRP, or the like, may be used for the material for the cover member 11; an electrically conductive material is not suitable.

The separable blade 1 as set forth in the present example embodiment is structured as described above, and is attached to the hub of the horizontal axis wind turbine.

The lightning discharge conductive wire 9 is grounded via the hub, the nacelle, and the tower. The lightning discharge conductive wire 9 may extend to the ground, or may be grounded through the use of metal components in the hub, the nacelle, and the tower.

In the separable blade 1 as set forth in the present embodiment, the exposed parts of the first fastener 4 in the vicinity of the partition part of the blade 1 serve as lightning receptor parts along with the Tip lightning receptor member 10. The lightning electrical current that strikes the Tip lightning receptor member 10 escapes to the ground through the lightning discharge conductive wire 9. The lightning electrical current that strikes the first fastener 4 escapes to the ground through the fasteners 5, 6, 7 and the lightning discharge conductive wires 8, 9, 13.

In the separable blade 1 as set forth in the present example embodiment, no special member for discharging the lightning is provided in the partition part, and thus the separable blade 1 is light and economical. Because there are no operations for building in a special member to discharge the lightning, the assembly operations are easy, and assembly can be performed in a short time. It possible to design the fasteners that are disposed within the blades so as to have adequate thickness, not only making it possible to ensure adequate fastening strength, but also making it possible to have desirable aerodynamic properties with little effect on the external shape of the blades.

The end portion (the exposed portion) of the first fastener 4 that is exposed on the blade surface of the first part blade 1T may protrude slightly from the blade surface of the first part blade 1T, or may be flush with the blade surface of the first part blade 1T. Even though having the first fastener 4 protrude from the blade surface will increase the lightning strike rate, doing so will have a negative impact on the aerodynamic properties. The height of protrusion of the first fastener 4 from the blade surface should be designed taking this into consideration.

Note that while in the present embodiment, of all of the fasteners, only the first fastener 4 was exposed at the blade surface to be a lightning receptor part, the second fastener 6 may also be exposed at the blade surface to be a lightning receptor part as well. In such a case, the height of the protrusion of the second fastener 6 from the cover member 11 (including the case where in the height of protrusion is zero) can be designed as appropriate, and this height can be achieved easily by forming, in the cover member 11, a hole or notch to expose the second fastener 6. Both the first fastener 4 and the second fastener 6 may be exposed so as to be lightning receptor parts, or, instead, only one or the other may be exposed to be a lightning receptor part.

Furthermore, in the reverse of the embodiment described above, the first hole part 21, the second hole part 22, and the first fastener 4 may be provided in the second part blade 1R and the third hole part 23, the fourth hole part 24, the second fastener 6, and the fastener 7 may be provided in the first part blade 1T.

Additionally, while the embodiment described above was one of a separable blade wherein the blade as a whole was assembled by connecting two part blades 1T and 1R in the lateral direction, instead the separable blade may be structured such that the blade as a whole is assembled by connecting, in the lateral direction, three or more part blades. When there are two or more partition parts as the result of having three or more part blades, the connecting structure with the lightning receptor part as set forth in the present invention may be applied to all of the partition parts, or the connecting structure with the lightning receptor part as set forth in the present invention may be applied to only a portion of the partition parts.

Additionally, while in the embodiment described above, all of the fasteners 4, 5, 6, and 7 were made from an electrically conductive material, at least the parts of the fasteners that are exposed at the blade surface, and the portions of the parts that are exposed at the blade surface, may be made from an electrically conductive material, and these may be connected within the blade to the lightning discharge conductive wire. If there are adequately strong non-conductive bolts, nuts, or other fasteners, these may be used as desired outside of the lightning discharge path.

While in the example embodiment described above, the lightning discharge conductive wire was connected to the jack bolt 7b of the fastener 7, the lightning discharge conductive wire may be connected to any part of any fastener insofar as there is electrical conductivity with the portion of the fastener that is exposed at the blade surface. The following embodiment is useful if the jack bolt 7b is not used, and in other cases.

Figure 7:
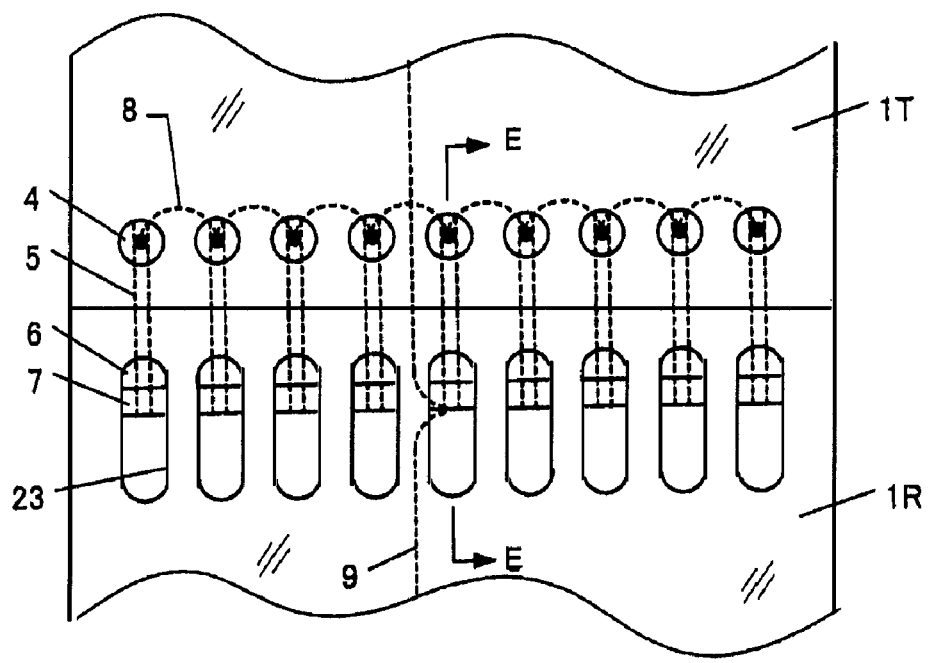
FIG. 7 is a plan view schematic diagram of the connector part of a separable blade as set forth in another embodiment.
Figure 8:
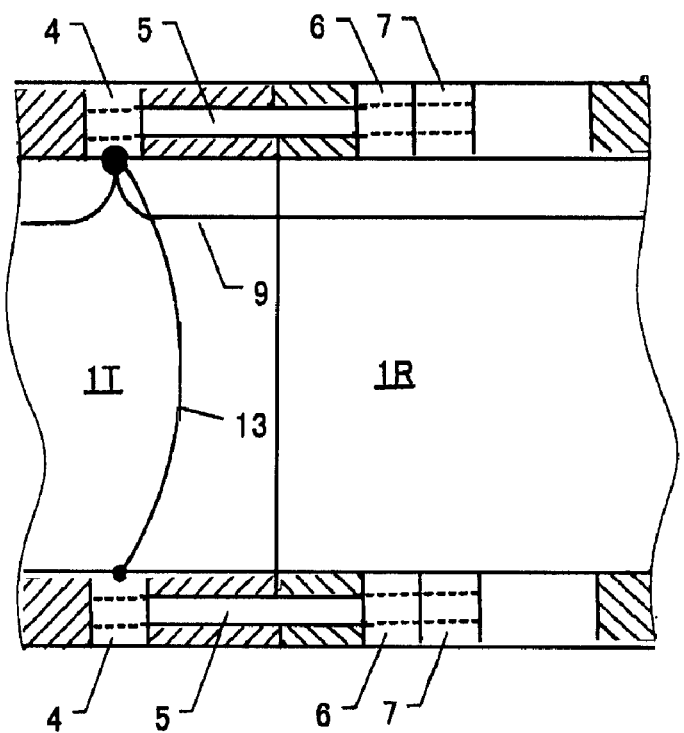
FIG. 8 is a cross-sectional schematic diagram along section E-E shown in FIG. 7.
Figure 9:
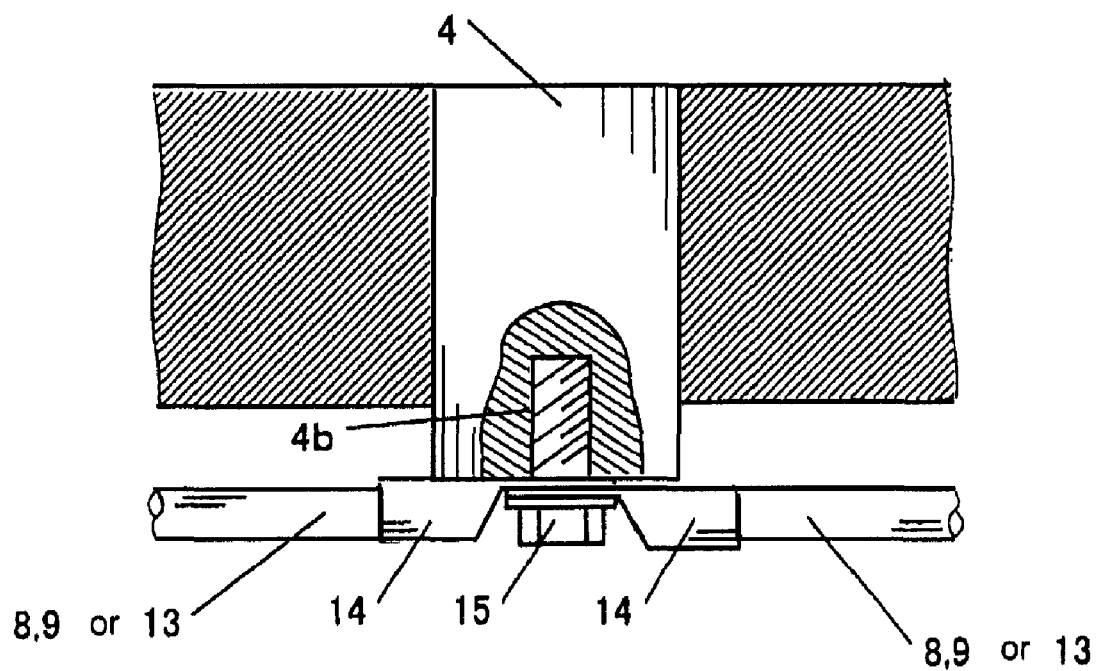
FIG. 9 is a vertical partially cross-sectional diagram of the first fastener, and the peripheral part thereof, of another embodiment.

Another embodiment pertaining to the connecting structure between the lightning discharge conductive wire and the fastener is, as shown in FIG. 7 through FIG. 9, a structure wherein the lightning discharge conductive wires 8, 9, and 13 are connected to the lightning receptor part that is the first fastener 4. The connection may be made using a bolt, by welding, or the like. If the connection is made using a bolt, then, as shown in FIG. 9, for example, a bolt 15 is fastened by screwing into a screw hole 4b that is provided on the inner end of the first fastener 4, through crimp-type terminals 14 that are provided on the lightning discharge conductive wires 8, 9, and 13, to cause the crimp-type terminals 14 to be pressed onto the first fastener 4. Each of the first fasteners 4, 4, 4 . . . above and below are provided with screw holes 4b, and the respective lightning discharge conductive wires 8, 9, and 13 can be connected using bolts 15.

When the second fastener 6 is exposed on the blade surface as the lightning receptor part instead of, or in addition to, the first fastener 4, preferably the lightning discharge conductive wires are connected to the second fastener 6. In this case as well, a screw hole is provided in the second fastener 6 to connect the lightning discharge conductive wire to the second fastener 6 using a bolt, or the connection is made through welding or through the use of some other method.

The connections between the lightning discharge conductive wires and the fasteners of the part blades may use bolt connections, welding, or other connecting methods, but preferably the method is one which, as far as is possible, does not reduce the strength with which the part blade is secured, and regardless of the method used, the connection should be designed so that there will be no problems in terms of strength.

What is claimed is:

1. A separable blade for a wind turbine wherein non-conductive part blades are connected in series in the longitudinal direction to assemble the blade as a whole, comprising:
a fastener for fastening together two adjacent part blades, disposed in an inner blade portion; and
a lightning discharge conductive wire that extends to a blade root, disposed in said inner blade portion;
wherein a portion of said fastener is exposed on the blade surface of at least one of said two part blades, and at least the portion of said fastener exposed at the blade surface comprises an electrically conductive material, and is connected electrically to said lightning discharge conductive wire.

2. A separable blade for a wind turbine of claim 1, further comprising a lightning receptor part on a blade tip part.

3. A separable blade for a wind turbine of claim 1, wherein said lightning discharge conductive wire is connected to a plurality of said fasteners that are provided.

4. A separable blade for a wind turbine comprising:
a non-conductive first part blade;
a non-conductive second part blade wherein the blade tip side end surface thereof is connected to the blade root side end surface of said first part blade;
a fastener for fastening said first part blade and said second part blade; and
a lightning discharge conductive wire that extends to a blade root, disposed in an inner blade portion;
wherein a first hole part that is open on the blade surface and a second hole part that is communicated with said first hole part and that is open on the blade root side end surface of said first part blade are formed in a blade root side end portion of said first part blade; and
a third hole part that is open on the blade surface and a fourth hole part that is communicated with said third hole part and that is open on the blade tip side end surface of said second part blade and continuously communicates with said second hole part are formed in a blade tip side end portion of said second part blade;
wherein said fastener comprises:
a first fastener that is disposed within said first hole part and locked by said first hole part;
a second fastener that is disposed within said third hole part and locked by said third hole part; and
a third fastener, which passes through said second hole part and said fourth hole part, which continuously communicate with each other, for connecting said first fastener to said second fastener, to tightly connect said first part blade to said second part blade;
wherein at least one of said first fastener and said second fastener is made from an electrically conductive material and one end surface thereof is exposed at the blade surface through said hole part, and is connected electrically to said lightning discharge conductive wire.

5. A separable blade for a wind turbine of claim 4, wherein a cover member is provided for covering an opening that opens at the blade surface of either said first hole part or said third hole part, and the fastener of the other hole part is exposed at the blade surface.

6. A separable blade for a wind turbine of claim 5, wherein said third fastener is a rod member having an external threaded portion on the tip portion thereof, wherein said fastener comprises a nut that threads onto said external threaded portion and that is housed within either said first hole part or said third hole part, and a jack bolt that screws onto the peripheral part of said nut to jack up said nut, wherein said lightning discharge conductive wire is connected to said jack bolt.

7. A separable blade for a wind turbine of claim 4, wherein said third fastener is a rod member having an external threaded portion on the tip portion thereof, wherein said fastener comprises a nut that threads onto said external threaded portion and that is housed within either said first hole part or said third hole part, and a jack bolt that screws onto the peripheral part of said nut to jack up said nut, wherein said lightning discharge conductive wire is connected to said jack bolt.

8. A separable blade for a wind turbine of claim 7, wherein the cover member is provided for covering the opening of the hole part that opens at the blade surface, the hole part being either said first hole part or said third hole part that houses said nut.

9. A separable blade for a wind turbine of claim 4, further comprising a lightning receptor part on a blade tip part.

10. A separable blade for a wind turbine of claim 4, wherein said lightning discharge conductive wire is connected to a plurality of said fasteners that are provided.

* * * * *